US009305339B2

(12) United States Patent
Yang et al.

(10) Patent No.: US 9,305,339 B2
(45) Date of Patent: Apr. 5, 2016

(54) MULTI-FEATURE IMAGE HAZE REMOVAL

(71) Applicant: Adobe Systems Incorporated, San Jose, CA (US)

(72) Inventors: Jianchao Yang, San Jose, CA (US); Jue Wang, Kenmore, WA (US); Ketan Tang, Shenzhen (CN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/320,987

(22) Filed: Jul. 1, 2014

(65) Prior Publication Data

US 2016/0005152 A1    Jan. 7, 2016

(51) Int. Cl.
G06K 9/40    (2006.01)
G06T 5/00    (2006.01)
H04N 5/232    (2006.01)
G06K 9/46    (2006.01)

(52) U.S. Cl.
CPC . G06T 5/002 (2013.01); G06K 9/40 (2013.01); G06K 9/4661 (2013.01); H04N 5/23229 (2013.01); H04N 5/23293 (2013.01); G06T 2207/10004 (2013.01); G06T 2207/10016 (2013.01); G06T 2207/10024 (2013.01); G06T 2207/20024 (2013.01); G06T 2207/20092 (2013.01); G06T 2207/20182 (2013.01)

(58) Field of Classification Search
CPC ........... G06T 5/002; G06T 5/008; G06T 5/50; G06T 2207/10004; G06T 2207/10016; G06T 2207/10024; G06T 2207/20024; G06T 2207/20182; G06T 2207/20092; G06K 9/40; G06K 9/4661; H04N 5/23229; H04N 5/23293
USPC ................................................ 382/274–275
See application file for complete search history.

(56) References Cited

U.S. PATENT DOCUMENTS 8,588,551 B2 * 11/2013 Joshi et al. ..................... 382/294
2011/0043603 A1 * 2/2011 Schechner et al. .............. 348/25

OTHER PUBLICATIONS

Ancuti, "A Fast Semi-Inverse Approach to Detect and Remove the Haze from a Single Image", Proceedings of the 10th Asian conference on Computer vision—Volume Part II, Queenstown, New Zealand, 2011., 14 pages.
Fattal, "Single Image Dehazing", presented at the ACM SIGGRAPH, Los Angeles, California, 2008., 9 pages.
He, et al., "Single Image Haze Removal Using Dark Channel Prior", In Computer Vision and Pattern Recognition, IEEE Conference on, 2009, 8 pages.
Tan, "Visibility in BadWeather from a Single Image", In Computer Vision and Pattern Recognition, IEEE Conference on, 2008, 8 pages.
Tarel, et al., "Fast Visibility Restoration from a Single Color or Gray Level Image", In Computer Vision, IEEE 12th International Conference on, 2009, 8 pages.

* cited by examiner

*Primary Examiner* — Kanjibhai Patel
(74) *Attorney, Agent, or Firm* — Wolfe-SBMC

(57) ABSTRACT

Multi-feature image haze removal is described. In one or more implementations, feature maps are extracted from a hazy image of a scene. The feature maps convey information about visual characteristics of the scene captured in the hazy image. Based on the feature maps, portions of light that are not scattered by the atmosphere and are captured to produce the hazy image are computed. Additionally, airlight of the hazy image is ascertained based on at least one of the feature maps. The calculated airlight represents constant light of the scene. Using the computed portions of light and the ascertained airlight, a dehazed image is generated from the hazy image.

20 Claims, 5 Drawing Sheets

300

302
Extract feature maps from a hazy image of a scene, each feature map conveying information about visual characteristics of the scene captured in the hazy image

304
Based on the feature maps, compute portions of light that are not scattered by atmosphere and are captured from the scene to produce the hazy image

306
Based on at least one of the feature maps, ascertain airlight of the hazy image that represents constant light of the scene

308
Generate a dehazed image from the hazy image using the computed portions of light and the ascertained airlight

*Fig. 3*

MULTI-FEATURE IMAGE HAZE REMOVAL

BACKGROUND

A scene captured in an image may be contaminated with haze, such as fog, dust, smoke, or other particles that obscure the clarity of the scene. However, a user may want the image to be free of the haze so that the scene is clearly depicted.

The process of recovering haze-free images from hazy images is generally called dehazing or haze removal. Dehazing images can increase the visibility of the scenes depicted in those images, facilitate other image processing tasks, enable depth to be estimated for objects depicted in the scenes, and so on. However, conventional techniques for dehazing images can result in images that appear unrealistic or, simply, are not visually pleasing, e.g., the resulting images are too dark.

SUMMARY

Multi-feature image haze removal is described. In one or more implementations, feature maps are extracted from a hazy image of a scene. The feature maps convey information about visual characteristics of the scene captured in the hazy image. Based on the feature maps, portions of light that are not scattered by the atmosphere and captured from the scene to produce the hazy image are computed. Additionally, airlight of the hazy image is ascertained based on at least one of the feature maps. The calculated airlight represents constant light of the scene. A dehazed image is generated from the hazy image using the computed portions of light and the ascertained airlight.

The dehazed image resulting from the image is generated, at least in part, by computing portions of light that are not scattered by the atmosphere and are captured from the scene. This computing reflects an assessment of: dark-channel information extracted from the image, contrast information extracted from the image, hue-disparity information extracted from the image as a result of obtaining a hue-disparity between pixels of the image and pixels of a semi-inverse of the image, and saturation information extracted from the image. Once the pixels of the image are adjusted based on the computed portions of light and the ascertained airlight, a filter may be applied that modifies the adjusted pixels so that their brightness resembles a brightness of the pixels before the haze was removed. In one or more implementations, the dehazed image may be presented through a user interface that is part of an image editing application that allows a user to access stored images and select to remove haze from a stored image. The user interface may also be configured as a view finder for a camera that displays the scene in real-time, but with the haze removed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 is a flow diagram depicting a procedure in an example implementation in which a dehazed image is generated from a hazy image based on computing portions of light that are not scattered by the atmosphere and are captured from the scene to produce the hazy image and ascertaining airlight of the hazy image.

DETAILED DESCRIPTION

Overview

Figure 1:
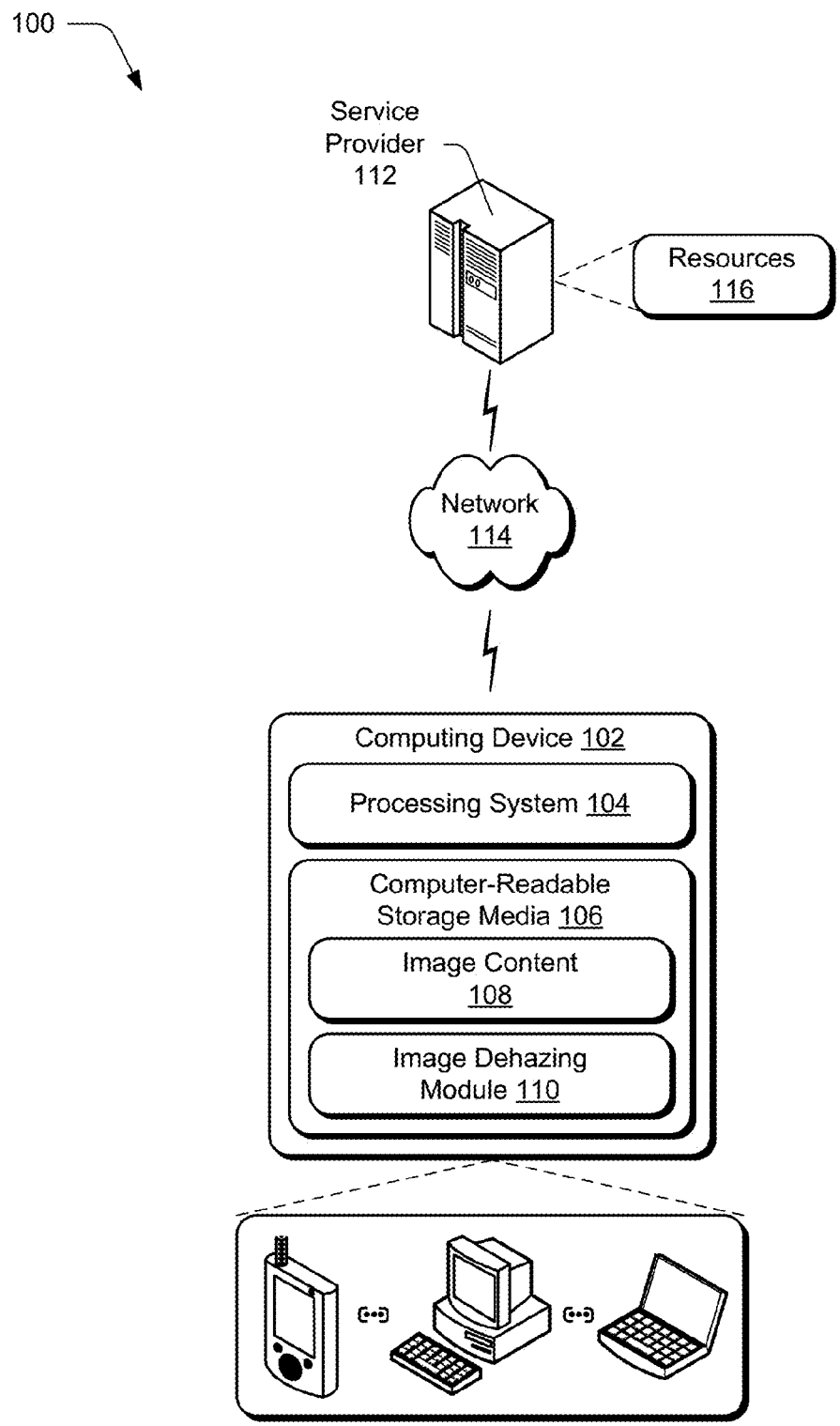
FIG. 1 is an illustration of an environment in an example implementation that is operable to employ techniques described herein.

Haze, such as fog, dust, smoke, and the like, may obscure the clarity of a scene captured in an image. A user may want the image to clearly show the scene, however. Specifically, the user may want the image to be free of the haze. Conventional techniques for dehazing images may result in dehazed images that are unrealistic or not visually pleasing. Consequently, when editing captured images, users may simply choose not to use haze removal features implemented using conventional dehazing techniques. Further, if a user knows that haze cannot be removed from hazy images to produce realistic or visually pleasing images, the user may even decide not to capture scenes contaminated with haze.

Multi-feature image haze removal is described. In one or more implementations, a user may select to remove haze from a hazy image of a scene. To do so, the hazy image may be processed to extract multiple feature maps from the hazy image. These feature maps may convey information about different visual characteristics of the scene that are captured in the hazy image (e.g., dark-channel information, contrast information, hue-disparity information between the hazy image and a semi-inverse of the hazy image, and saturation information).

Based on the extracted feature maps, portions of light that are transmitted from the scene (and captured by an imaging device) to produce the hazy image are computed. As part of doing so, corresponding regions from each of the feature maps may be input into a trained model (e.g., a trained Random Forest model), the output of which indicates portions of light that are not scattered by the atmosphere and captured from a portion of the scene corresponding to the regions. Inputting the corresponding regions of the extracted feature maps may be repeated until regions covering an entirety of the image have been input into the trained model. By doing so, captured portions of the light may be computed for the whole scene depicted in the image.

These computed portions of captured light may be used with "airlight" that is ascertained for the hazy image to generate a dehazed image from the hazy image (e.g., by adjusting the pixels of the hazy image). The airlight ascertained for the hazy image represents constant light of the scene. Application of this process, however, may result in a dehazed image that is not visually pleasing, e.g., the resulting image may be blocky or too dark. Consequently, a filter may be applied to the dehazed image to further modify its pixels and result in a visually pleasing image. For example, a filter may be applied to the dehazed image that further modifies the pixels by smoothing airlight calculated for the pixels. Alternately or additionally, a filter may be applied to the dehazed image to modify its pixels so that a brightness of the dehazed image resembles that of the hazy image.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes image content 108 and an image dehazing module 110 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 5.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Such image content may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The image dehazing module 110 may represent functionality to implement multi-feature image haze removal as described herein. For example, the image dehazing module 110 may be configured in various ways to generate a dehazed image from a hazy image, e.g., one that is included in the image content 108. To do so, the image dehazing module 110 may first process a hazy image to extract multiple feature maps that convey information about different visual characteristics of the scene captured in the hazy image.

Based on the feature maps, the image dehazing module 110 may compute portions of light that are not scattered by the atmosphere and captured from the scene to produce the hazy image. To compute the portions of light that are captured from the scene, the image dehazing module 110 may use a trained model (e.g., a Random Forest model). The image dehazing module 110 may train the model using machine-learning techniques. As input to the trained model, the image dehazing module 110 may provide corresponding regions from each of the feature maps. The image dehazing module 110 may employ the trained model to output indications of the light that is not scattered by the atmosphere and captured from a portion of the scene that corresponds to the regions. The image dehazing module 110 may provide corresponding regions from each of the feature maps to the trained model until regions covering an entirety of the image have been input.

The image dehazing module 110 also ascertains an "airlight" for the hazy image. The ascertained airlight represents constant light of the scene. To ascertain the airlight, the image dehazing module 110 may consider at least one of the feature maps, such as a feature map conveying dark-channel information about the hazy image.

Given the portions of non-scattered and captured light and the ascertained airlight, the image dehazing module 110 can generate a dehazed image from the hazy image. The dehazed image generated by the image dehazing module 110 may not yet be visually pleasing, however. Consequently, the image dehazing module 110 may also apply a filter to the dehazed image to further modify its pixels, the result of which is an image that not only is visually pleasing but is also free of haze.

The image dehazing module 110 may be implemented as a software module, a hardware device, or using a combination of software, hardware, firmware, fixed logic circuitry, etc. Further, the image dehazing module 110 may be implemented as a standalone component of the computing device 102 as illustrated. In addition or alternatively, the image dehazing module 110 may be configured as a component of a web service, an application, an operating system of the computing device 102, a plug-in module, or other device application as further described in relation to FIG. 5.

Having considered an example environment, consider now a discussion of some example details of the techniques for multi-feature image haze removal in accordance with one or more implementations.

Multi-Feature Image Haze Removal Details

Figure 2:
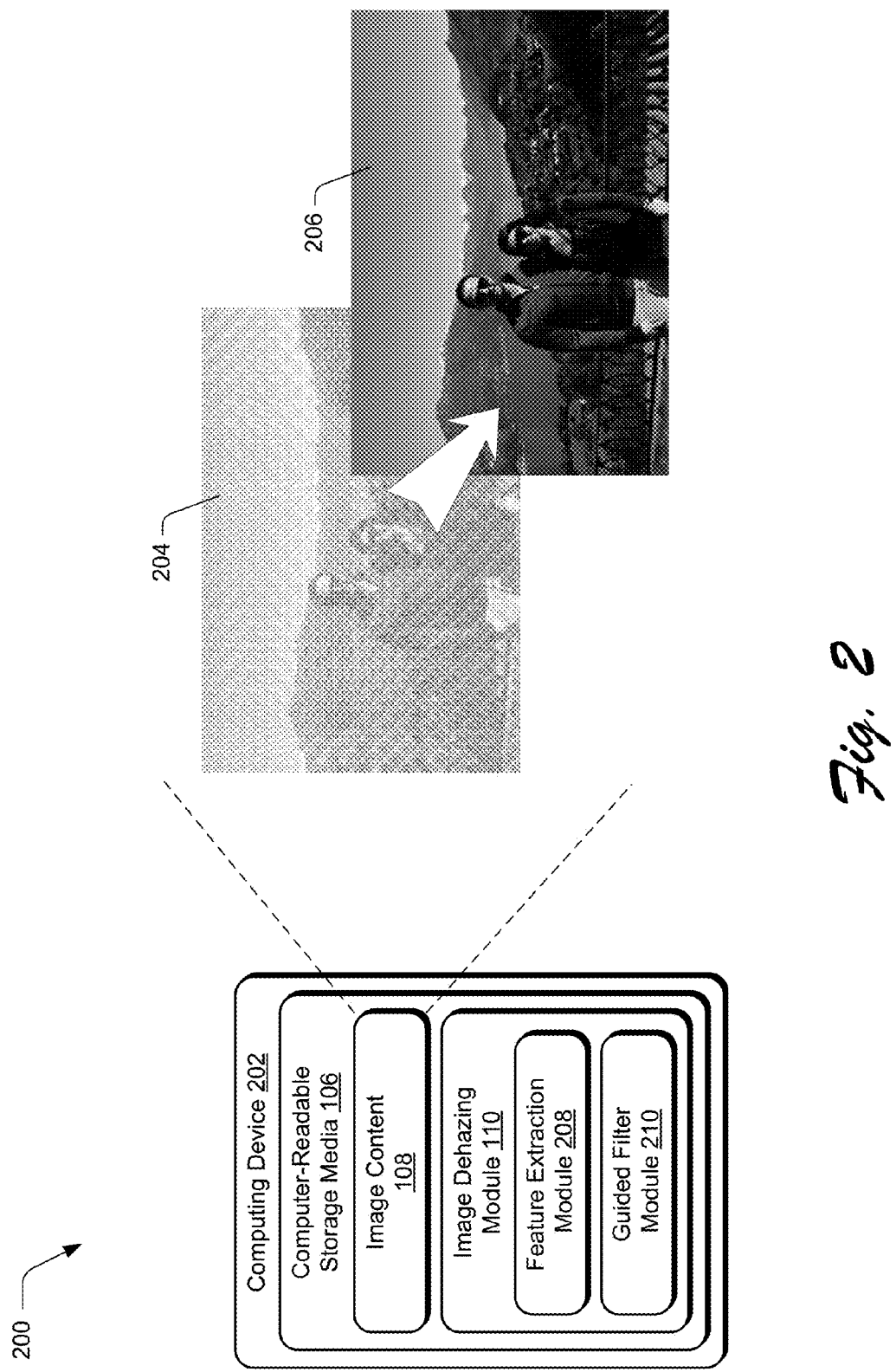
FIG. 2 illustrates from the environment of FIG. 1 examples of image content of a computing device and an image dehazing module of the computing device in greater detail.

This section describes some example details of multi-feature image haze removal in accordance with one or more implementations. FIG. 2 depicts generally at 200 some portions of the environment 100 of FIG. 1, but in greater detail. In particular, FIG. 2 depicts examples of the image content 108 of a computing device, the computer-readable storage media 106 of the computing device, and the components included therein.

In FIG. 2, the computer-readable storage media 106 is illustrated as part of computing device 202 and includes the image content 108 and the image dehazing module 110. The examples of image content 108 illustrated in FIG. 2 include a hazy image 204 and a dehazed image 206. The image dehazing module 110 is illustrated with a feature extraction module 208 and a guided filter module 210. These modules represent functionality of the image dehazing module 110 and it should be appreciated that such functionality may be implemented using more or fewer modules than those illustrated.

In general, the image dehazing module 110 may employ feature extraction module 208 and a guided filter module 210 to generate dehazed images (e.g., dehazed image 206) from hazy images (e.g., hazy image 204). The image dehazing module 110 performs the dehazing in accordance with the common imaging model:

$$I(x)=J(x)t(x)+A(1-t(x))$$

In this model, I(x) represents the observed intensity at position x of a captured image (e.g., position x of the hazy image 204) and J(x) represents the image to be recovered at position x (e.g., position x of the dehazed image 206). The term A represents global airlight, which is the constant light of the scene. The term t(x) represents the transmission by the medium and describes the portion of light that is not scattered and reaches the camera.

Given the global airlight A and the transmission t, the image J (e.g., dehazed image 206) can be recovered from image I (the hazy image 204) according to the following:

$$J = \frac{I-A}{t} + A$$

From the hazy image, the image dehazing module 110 is configured to derive both the global airlight A and the transmission t. To do so, the image dehazing module 110 is configured to train a model (e.g., a Random Forest model) to provide the transmission for regions of the hazy image 204. The Random Forest approach is an example of a machine-learning technique that may learn to associate transmission with a portion of a scene given visual characteristics of that portion. The Random Forest approach is an ensemble learning method for classification (and regression) that operates by constructing a multitude of decision trees at the time they are trained, and outputting a class (e.g., a transmission) that is a mode of the classes (e.g., transmissions) output by the individual trees. Although the Random Forest approach is discussed for training a model to derive transmissions for a given region of a hazy image, it should be appreciated that other machine-learning techniques may be employed without departing from the spirit or the scope of multi-feature image haze removal.

Regardless of how the model is trained, the image dehazing module 110 may provide corresponding regions from multiple feature maps that were extracted from the hazy image 204 as input to the trained model. Each of the feature maps extracted from an image have a same size as one another and as the image from which they were extracted.

Consider an example in which the dimensions of an image are 100 pixels×200 pixels, and in which the image dehazing module extracts thirty feature maps from the image. It follows that the dimensions of each feature map extracted from the image will also be 100 pixels×200 pixels. In this example, a 10 pixel×10 pixel square may be taken from an upper left corner of each of the thirty feature maps. These thirty 10 pixel×10 pixel squares may be considered corresponding regions. Continuing with this example, a second 10 pixel×10 pixel square may be taken from each of the thirty feature maps that is adjacent to the 10 pixel×10 pixel from the upper left corner. These second thirty 10 pixel×10 pixel squares may also be considered corresponding regions.

Accordingly, when the image dehazing module 110 provides corresponding regions to the trained model as input, the thirty 10 pixel×10 pixel squares from the upper left corner of the feature maps may be provided. The image dehazing module 110 may then provide the second thirty 10 pixel×10 pixel squares as input for the trained model. This process (providing thirty corresponding 10 pixel×10 pixel squares as input for the trained model) may be repeated by the image dehazing module 110 until regions covering the whole image have been input. In this example, in which 10 pixel×10 pixel squares are used, the image dehazing module would input 200 different sets of thirty corresponding regions (e.g., 10 pixel×10 pixel squares from each feature map) to the trained model. In this way, corresponding regions covering an entirety of the image are input to the trained model. It is to be appreciated that the 10 pixel×10 pixel squares are merely an example of a region size that can be used. Corresponding regions of other sizes and shapes may be taken from the feature maps without departing from the scope of the techniques described herein.

With regard to the feature maps, the image dehazing module 110 includes functionality to extract feature maps from hazy image 204. Unlike conventional techniques, the techniques described herein extract feature maps that convey information about multiple different visual characteristics of the scene captured in the hazy image 204. To extract these feature maps, the image dehazing module 110 may employ a feature extraction module 208. The feature extraction module 208 represents functionality to extract feature maps that convey information about dark-channel of the hazy image 204 at multiple different resolutions, max contrast within a local region of the hazy image 204 at multiple different resolutions, hue-disparity between a semi-inverse image of the hazy image 204 and the hazy image 204 itself, and max pixel-wise saturation within a local region of the hazy image 204.

Although not shown, the feature extraction module 208 may include dedicated modules to perform actions related to each of the above noted visual characteristics. The feature extraction module 208 may include a multi-resolution dark channel module, a multi-resolution local max contrast module, a hue-disparity module, and a local max saturation module, for example. Having discussed some of the functionality of the feature extraction module 208, the visual characteristics that are to be extracted from the hazy image 204 are now discussed.

Multi-Resolution Dark-Channel

Dark-channel information is based on the observation that in non-sky regions of haze-free outdoor images at least one color channel (e.g., from the RGB channels) has a low intensity at some pixels. In other words, haze-free outdoor images generally have a dark-channel that is significantly darker than images with haze. This can be attributed to haze-free images usually being more saturated (some color channel has a relatively large value and another color channel has a relatively small value) than hazy images. The dark-channel information extracted from hazy image 204 and conveyed by a corresponding feature map indicates a minimum color channel in a given region. Given input image I, a region size parameter r, and position x, the dark channel of an image $D_r^I(x)$ may be computed according to the following:

$$D_r^I(x) = \min_{y \in \Omega_r(x)} \min_{c \in (r,g,b)} \frac{I^c(y)}{A} \in [0, 1]$$

In this equation, $\Omega_r(x)$ represents a region centered at position x with size r×r. The feature extraction module 208 extracts this information at multiple different resolutions, the result of which is a feature map conveying dark-channel information at each resolution.

For example, the feature extraction module 208 may extract dark-channel information from the hazy image 204 at a first resolution for which size parameter r is equal to 10. Thus, one of the feature maps conveys dark-channel information for a resolution of 10 pixels×10 pixels, such that the regions from which the minimum color channel is ascertained are 10 pixels×10 pixels. The feature extraction module 208 may also extract dark-channel information from the hazy image 204 at a second resolution for which size parameter r is equal to 7. Thus, another of the feature maps conveys dark-channel information for a resolution of 7 pixels×7 pixels, such that the regions from which the minimum color channel is ascertained are 7 pixels×7 pixels.

In any case, the feature extraction module 208 can extract dark-channel information from the hazy image 204 at several different resolutions. For example, the feature extraction module 208 may extract dark-channel information at four different resolutions (e.g., where size parameter r is equal to 10, 7, 4, and 1) to result in four different dark-channel feature maps. It is to be appreciated that the dark-channel information may be extracted from hazy image 204 for a different number of resolutions than four, and that the size parameter r may be equal to numbers other than 10, 7, 4, and 1, without departing from the techniques described herein.

Multi-Resolution Local Max Contrast

Contrast refers to a difference between the brightness and color of one object in a given region and the brightness and color of another object. The local max-contrast information extracted from hazy image 204 and conveyed by a corresponding feature map indicates, for a given region, a difference between the brightest color channel observed in the region and the darkest color channel observed in the region. Given input image I, a local contrast region size parameter $r_1$, and a local maximum region size parameter $r_2$, the local max contrast of an image $C_{r1,r2}^I(x)$ may be computed according to the following:

$$C_{r1,r2}^I(x) = \max_{y \in \Omega_{r2}(x)} \sqrt{\frac{1}{3|\Omega(y)|} \sum_{z \in \Omega_{r1}(y)} \sum_{c \in (r,g,b)} (I^C(z) - I^C(y))^2} \in [0, 1)$$

In this equation, $\Omega_{r1}(y)$ represents a region centered at position y having size $r_1 \times r_1$. In this equation, $\Omega_{r2}(x)$ represents a region centered at position x having size $r_2 \times r_2$. The feature extraction module 208 extracts this information at multiple different resolutions, the result of which is a feature map conveying local max contrast information at each resolution.

For example, the feature extraction module 208 may extract local max contrast information from the hazy image 204 at a first resolution for which local contrast region size parameter $r_1$ is equal to 5 and local maximum region size parameter $r_2$ is equal to 1. When local max contrast information is extracted for other feature maps, the feature extraction module 208 may fix the local contrast region size parameter $r_1$, but vary the local maximum region size parameter $r_2$. Thus, one of the feature maps may convey local max contrast information where the local maximum region has a resolution of 1 pixel×1 pixel, and another feature map may convey the local max contrast information where the local maximum region has a different resolution, such as 2 pixels×2 pixels.

In any case, the feature extraction module 208 may extract local max contrast information from the hazy image 204 at several different resolutions. For example, the feature extraction module 208 may extract local max contrast information for more than two corresponding feature maps, and may also do so where the local contrast region size parameter $r_1$ is equal to a number other than 5, and where the local maximum region size parameter $r_2$ is equal to a number other than 1 or 2, without departing from the techniques described herein.

Hue Disparity

Hue disparity refers to a difference in hue between the hazy image 204 and a "semi-inverse" of the hazy image. The "semi-inverse" of an image is obtained by replacing RGB values of each pixel in the image on a per channel basis by the maximum of the initial RGB channel value (r, g, or b) and its inverse (1−r, 1−g, or 1−b). Given input image I, its semi-inverse $I_{si}^C(x)$ is computed at each position x according to the following equation:

$$I_{si}^C(X) = \max[I^C(X), 1 - I^C(x)], c \in \{r,g,b\}$$

Once the semi-inverse of hazy image 204 is computed, the hue disparity between the semi-inverse image and hazy image 204 can be determined. With a haze-free image, it is rare that the inverse is selected for each color channel of a given pixel when obtaining the semi-inverse of that image. Consequently, there is a significant hue change between $I_{si}$ and I. With a hazy image, however, the inverse of each color channel is often selected for a given pixel. The result is that there is generally no hue change to the semi-inverse image. Given input image I and its semi-inverse $I_{si}$, the feature extraction module 208 computes hue disparity $H^I$ between those images according to the following equation:

$$H^I = \frac{|I_{si}^{Lch}(:,:,3) - I^{Lch}(:,:,3)|}{360} \in [0, 1)$$

The hue disparity $H^I$ between input image I and its semi-inverse $I_{si}$ is usually noisy. The hue disparity $H^I$ calculated by the feature extraction module 208 using the equation above may be noisy as a result of impulse noise, for example. As such, the feature extraction module 208 may filter the computed hue disparity to remove the noise. In some implementations, the feature extraction module 208 may use a median filter to filter the hue disparity $H^I$. A median filter employs a nonlinear filtering technique which, in the case of hue disparity, may involve traversing the hue disparity values by pixel, and replacing the hue disparity values with a median of neighboring hue disparity values.

Local Max Saturation

Saturation refers to the perceived intensity of a specific color. In particular, saturation is the colorfulness of a color relative to its own brightness. Generally, the saturation observed in hazy images is lower than that observed in haze-free images. The local max saturation information extracted from hazy image 204 and conveyed by a corresponding feature map may indicate, for a given region, a maximum pixel-wise saturation observed in the region. Given input image I, a region size parameter r, and a position x, the local max saturation of an image $S_r^I(x)$ may be computed according to the following:

$$S_r^I(x) = \max_{y \in \Omega_r(x)} S^I(y) = \max_{y \in \Omega_r(x)} \left(1 - \frac{\min_{c \in (r,g,b)} I^c(y)}{\max_{c \in (r,g,b)} I^c(y)}\right) \in [0, 1]$$

In this equation, $\Omega_r(y)$ represents a region centered at position y having size r×r, and $\Omega_r(x)$ represents a region centered at position x having size r×r. The feature extraction module 208 may extract this information with the region size parameter r equal to 1, the result of which is a feature map for which the local max saturation reduces to pixel-wise saturation. The local max saturation may also be taken for multiple different resolutions (e.g., where the region size parameter r equals a number other than 1) without departing from the spirit or the scope of multi-feature image haze removal.

Having discussed example details of different visual characteristics for which feature maps may be extracted by the image dehazing module 110, consider now additional functionality represented by the image dehazing module 110.

As discussed briefly above, the image dehazing module 110 provides corresponding regions of extracted feature maps to a trained model to compute portions of light captured from the scene (e.g., transmission t) for a respective portion of the image. Prior to doing so, however, the image dehazing module 110 may sort the corresponding regions by value. The corresponding region taken from each feature map may be represented with a vector and be normalized, such that a value corresponding to the vector falls between 0 and 1. By representing each corresponding region in this way, the image dehazing module 110 may sort the corresponding regions even though each is from a feature map that conveys information about a different visual characteristic.

In addition to computing portions of light captured from the scene to generate dehazed image 206, the image dehazing module 110 also ascertains airlight in the hazy image 204. To do so, the image dehazing module 110 may consider at least one of the extracted dark-channel feature maps. From the dark-channel feature map, the image dehazing module 110 may find a subset of pixels (e.g., one-percent of pixels) that have the largest dark-channel values of the hazy image. The image dehazing module 110 may then determine the airlight for the pixel in the subset that has the median dark-channel value. The airlight of that pixel may then be used for generation of dehazed image 206.

With the transmission t and airlight A, the image dehazing module 110 can generate the dehazed image J from hazy image I. To do so, the image dehazing module 110 may consider pixel values for each pixel of hazy image 204, and adjust those values to account for the transmission and the airlight. Said another way, the image dehazing module 110 generates dehazed image 206 by adjusting the pixel values of the hazy image 204 to remove the haze.

The dehazed image that is initially recovered can be visually displeasing, however. For example, the dehazed image initially recovered may in some cases be blocky or considered too dark to be visually pleasing. This may result from using regions of a particular size as input to the trained model or from the particular visual characteristics that are assessed. In any case, the image dehazing module 110 may employ guided filter module 210 to filter the dehazed image initially recovered so that the resulting dehazed image is visually pleasing.

By applying a guided filter to the initially recovered dehazed image, the guided filter module 210 may further modify at least some of the adjusted pixel values. In one or more implementations, the guided filter module 210 may choose a guided filter to apply based on the visual characteristics of the hazy image. A discussion regarding the different filtering techniques, which can each be implemented by application of a guided filter now follows.

Guided Adaptive Airlight

The guided filter module 210 may employ a filter that adapts airlight ascertained for each pixel of the dehazed image based on image brightness. The guided filter module 210 may employ such a filter for images in which the scene is obscured by a weak haze. When the scene is obscured by a heavy haze, however, the guided filter module 210 may employ a filter that implements guided brightness scaling, which is discussed in greater detail below. A guided adaptive airlight filter may be implemented by solving the following optimization:

$$\min_A \sum_{I,J} ((Y_J(x) - Y_I(x))^2 + \lambda(A(x) - A_0)^2) + \phi(A)$$

In this optimization, $$Y_J(x) = \frac{Y_I(x) - A(x)}{r(x)} + A(x)$$

is me brightness of the initially dehazed image (e.g., dehazed image 206), and $Y_I$ is the brightness of the hazy image (e.g., hazy image 204). Further, $\phi(\bullet)$ is a smoothness constraint, which can be total variation (TV). Since solving this optimization can be generally time consuming, the guided filter module 210 may ascertain airlight A for each pixel of the initially dehazed image and then smooth the airlight A between the pixels with a guided filter that uses the original image (e.g., hazy image 204) as guidance.

Guided Brightness Scaling

Alternately, the guided filter module 210 may employ a filter that scales the brightness of the resulting images. As noted above, a guided brightness scaling filter may be chosen when a scene captured in the hazy image is obscured by a heavy haze. Additionally, a guided brightness scaling filter may be applied to an initially recovered dehazed image when a brightness of that image falls outside of an acceptable range of brightness. When the determined brightness is below the range the image is considered too dark and the brightness is scaled to lighten the image. When the determined brightness is above the range the image is considered too light and the brightness is scaled to darken the image. A guided brightness scaling filter may cause brightness $Y_J$ of the dehazed image to be scaled such that the luma component $Y_J'$ of a given pixel is equal to a scaled brightness $sY_J$. The guided filter module 210 may scale the brightness using scaling factor (or function) s so that $Y_J'$ substantially matches a brightness of the hazy image $Y_I$. The guided brightness filter may be implemented by solving the following:

$$\min_s \sum_x \left( \left(1 - s(x)\frac{Y_J(x)}{Y_I(x)}\right)^2 + \lambda(s(x) - 1)^2 \right) + \phi(s)$$

In this optimization, x represents a pixel position being scaled, λ represents a regularization parameter, and Φ(•) is again a smoothness constraint (e.g., total variation (TV)). Filters, other than ones based on guided adaptive airlight and guided brightness scaling, may be employed in conjunction with generating a dehazed image without departing from the techniques described herein. Whichever filter is chosen may be applied to an initially dehazed image by the guided filter module 210 automatically and without express user input to apply the chosen filter. By applying such a filter, the guided filter module 210 further modifies the pixels of an initially dehazed image to produce a final dehazed image that is visually pleasing.

Returning to the discussion of additional functionality represented by the image dehazing module 110. The image dehazing module 110 may also represent functionality to initiate display of a dehazed image. Once a dehazed image is generated by the image dehazing module 110, it may be presented to a user. The dehazed image may be presented through a user interface of a photo-editing application, for example. Through the user interface, a user may select to save the dehazed image or undo the dehazing so that the hazy image is recovered.

Additionally, the dehazed image may be shown through a user interface used to view a scene in real-time. For example, a device (e.g., a camera, a phone, and so on) may display a particular interface for capturing images. However, the techniques described herein may enable the scene that is to be captured to be displayed in that user interface substantially in real-time and without haze. The device may be configured to do so, for instance, responsive to selection of a haze-free display mode. Further, when the user indicates that the scene is to be captured (e.g., by depressing a shutter release button), the device (e.g., the camera, the phone, and so on) may capture an image of the scene and automatically process the captured image to remove haze.

The user interface may be configured with yet other functionality relating to haziness of an image. For example, the user interface may include a haziness slider that enables a user to control an amount of haze in an image. By moving the slider to one end, a user may cause the image dehazing module 110 to generate a haze-free image. However, if the slider is moved to the other end, an image may be generated that is completely or almost completely obscured by haze. Furthermore, components of the user interface may allow a user to select a type of haze that is to be added to the image (e.g., fog, dust, smoke, pollution, and so on).

To add haze to a captured image, the captured image may first be dehazed as described in detail above. A new transmission map (e.g., in contrast to the transmission map obtained to dehaze the image) may be obtained for the captured image by adjusting a scattering coefficient β. In particular, the map for the new transmission $t^{new}(x)$ may be obtained according to the following equation:

$$t^{new}(x) = \exp(-\hat{\beta}d(x)) = |\exp(-\beta d(x))|^{\frac{\hat{\beta}}{\beta}} = |t(x)|^p$$

With the new transmission $t^{new}$, a hazy image can be synthesized from the captured image. By adjusting parameter p, different amounts of haze can be synthesized within the image. When p equals 1, however, the captured image I is produced. Given the new transmission $t^{new}$, a new hazy image may be generated based on the following equation:

$$I^{new}(x)=J(x)t^{new}(x)+A(1-t^{new}(x))$$

Having discussed example details of the techniques for multi-feature image haze removal, consider now some example procedures to illustrate additional aspects of the techniques.

Example Procedures

This section describes example procedures for multi-feature image haze removal in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of an image dehazing module 110.

FIG. 3 depicts an example procedure 300 in which a dehazed image is generated from a hazy image based on computing portions of light that are not scattered by the atmosphere and captured from the scene to produce the hazy image and calculating airlight of the hazy image. Once an image of a scene is selected for haze removal, feature maps are extracted from the hazy image (block 302). Each feature map that is extracted from the hazy image conveys information about some visual characteristic of the scene captured in the hazy image.

By way of example, the image dehazing module 110 employs feature extraction module 208 to extract multiple feature maps from hazy image 204. In this example, the feature extraction module 208 extracts feature maps that convey information about: dark-channel characteristics of the hazy image 204, contrast characteristics of the hazy image 204, hue discrepancy between the hazy image 204 and a semi-inverse of the hazy image, and saturation characteristics of the hazy image. In the case of dark-channel information, contrast information, and saturation information, the feature extraction module 208 may extract information regarding these characteristics at different resolutions (e.g., take into consideration different sized regions of the hazy image 204 when determining dark-channel).

Based on the features maps, portions of light that are not scattered by the atmosphere and are captured from the scene to produce the hazy image are computed (block 304). For example, the image dehazing module 110 uses corresponding regions from the extracted feature maps as input to a trained model, e.g., a trained Random Forest model. Given the corresponding regions, the trained model produces a transmission t for each position of a respective portion of the hazy image. The transmission t represents a portion of light that is not scattered by the atmosphere and is captured from the scene to produce the hazy image 204. Light that is transmitted by the scene but scattered by haze is not represented by transmission t.

Airlight of the hazy image is ascertained based on at least one of the extracted feature maps (block 306). The airlight ascertained for the hazy image represents constant light of the scene. By way of example, the image dehazing module 110 ascertains airlight from the hazy image using a dark-channel feature map of the hazy image 204. In one or more implementations the image dehazing module 110 does so by initially finding a subset of pixels (e.g., one-percent of pixels) that have the largest dark-channel values of the hazy image 204. The image dehazing module 110 then determines the airlight for the pixel of that subset that has the median dark-channel value.

Using the computed portions of light and the ascertained airlight, a dehazed image is then generated from the hazy image (block 308). For example, the image dehazing module 110 uses the portions of light computed at block 304 and the airlight ascertained at block 306 to generate dehazed image 206 from hazy image 204.

Figure 4:
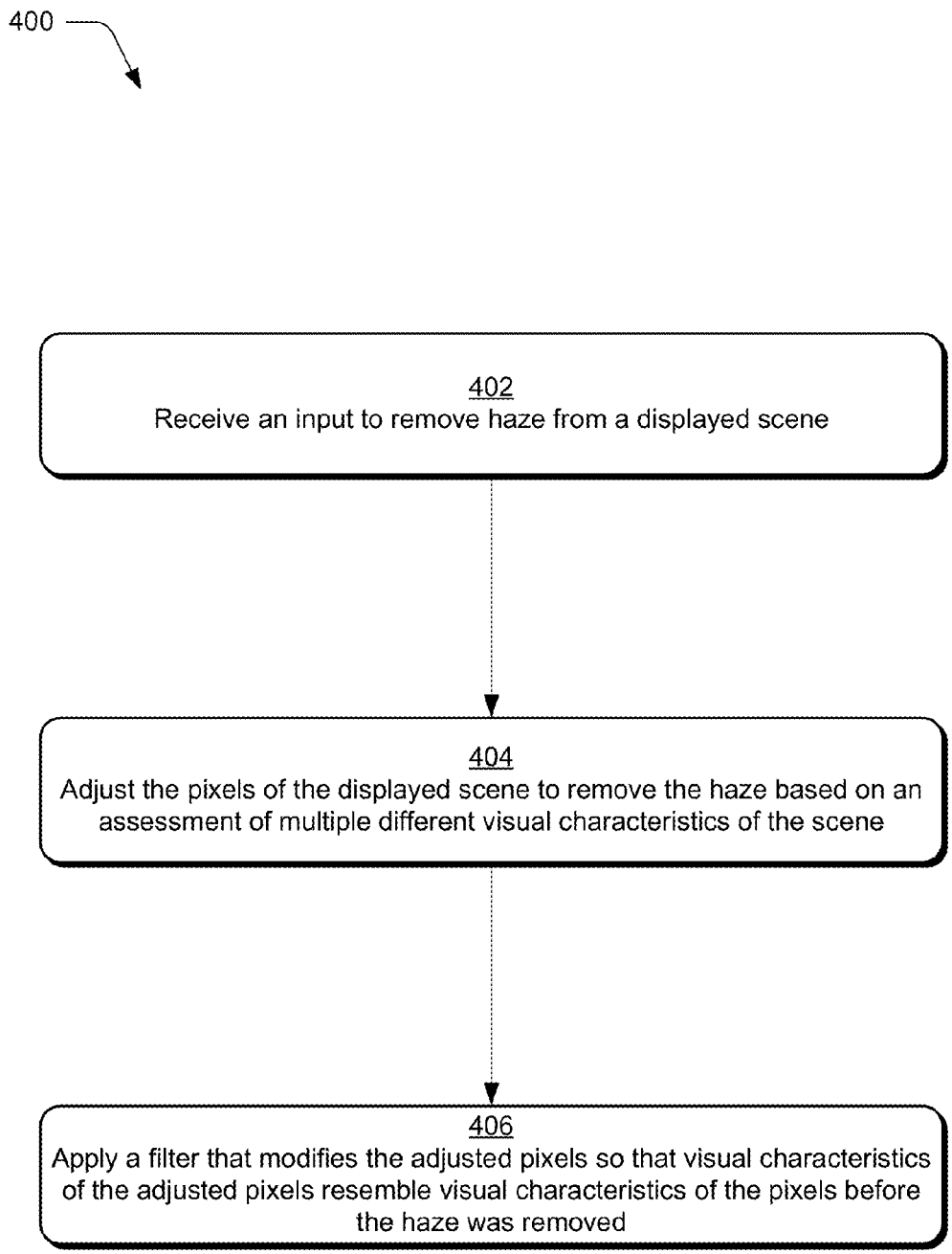
FIG. 4 is a flow diagram depicting a procedure in an example implementation in which haze is removed from a displayed scene by adjusting pixels of the displayed scene.

FIG. 4 depicts an example procedure 400 in which a haze is removed from a displayed scene by adjusting pixels of the displayed scene. Through a user interface, input is received to remove haze from a scene that is displayed in the user interface (block 402).

For example, an application (not shown) configured as an image editing application may display an image via a user interface that depicts a scene. The user interface of the application may include an option (e.g., in a drop-down menu, a button, or other mechanism) to remove haze from the displayed scene. In another example, the user interface may be configured as a view-finder for a camera and through which the scene can be viewed in real-time or substantially in real-time. The device at which the view-finder is displayed may include a button (e.g., physical button or soft button) to remove haze from the scene depicted in the view finder. In any case, a user selects to remove haze from the displayed scene.

Pixels of the displayed scene are then adjusted to remove the haze based on an assessment of multiple different visual characteristics of the scene (block 404). For example, the image dehazing module 110 employs feature extraction module 208 to extract feature maps for multiple different visual characteristics of the displayed scene, such as at block 302. The visual characteristics that the image dehazing module 110 assesses include: dark-channel information of the displayed scene, contrast information of the displayed scene, hue-disparity information of the displayed scene that results from obtaining a hue-disparity between pixels of the displayed scene and pixels of a semi-inverse of the displayed scene, and saturation information of the displayed scene. Based on these characteristics, the image dehazing module 110 computes portions of light that are not scattered by the atmosphere and are captured from the scene by a camera, ascertains airlight for the displayed scene, and generates a dehazed image of the scene. Oftentimes, however, this initially generated dehazed image may not be considered visually pleasing, e.g., it may be blocky or may be considered too dark.

A filter that modifies the adjusted pixels is then applied so that a brightness of the adjusted pixels resembles a brightness of the pixels before the haze was removed (block 406). By applying the filter, the resulting image may be modified so that it is visually pleasing. The filter may be applied to remove blocky artifacts or to brighten the image. By way of example, the image dehazing module 110 employs guided filter module 210 to further modify the pixels that were adjusted at block 404. The guided filter module 210 may filter the initially dehazed image with a guided adaptive airlight filter or a guided brightness scaling filter. Application of the guided adaptive airlight filter involves ascertaining airlight for each pixel of the initially generated dehazed image, and then using the originally displayed scene to smooth the airlight between the pixels. Application of the guided brightness scaling filter involves scaling brightness of pixels of the dehazed image by some scaling parameter so that their brightness substantially matches that of the displayed scene.

Having described example procedures in accordance with one or more implementations, consider now an example system and device that can be utilized to implement the various techniques described herein.

Example System and Device

Figure 5:
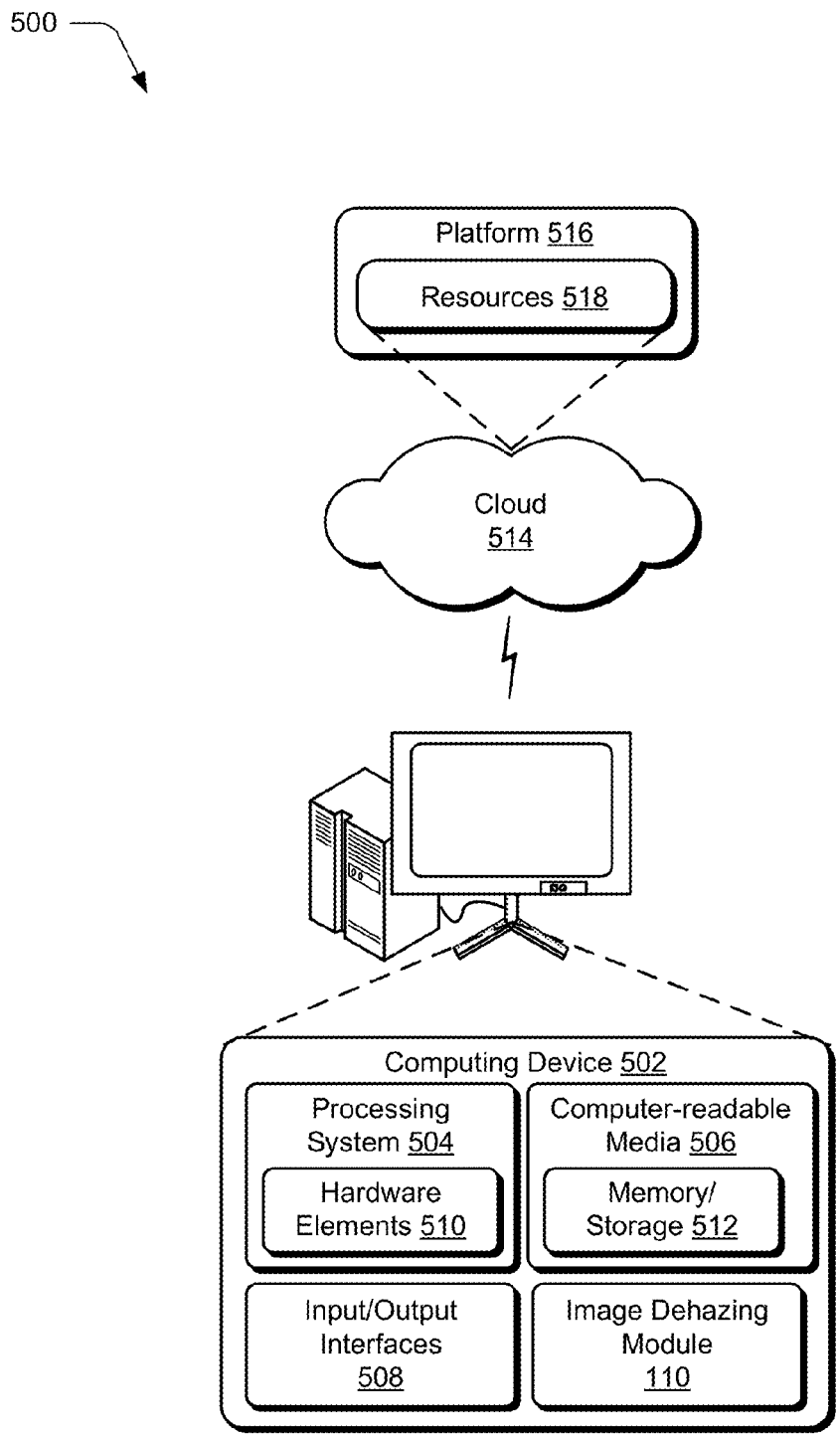
FIG. 5 illustrates an example system including various components of an example device that can be employed for one or more implementations of multi-feature image haze removal techniques described herein.

FIG. 5 illustrates an example system generally at 500 that includes an example computing device 502 that is representative of one or more computing systems and/or devices that may implement the various techniques described herein. This is illustrated through inclusion of the image dehazing module 110, which operates as described above. The computing device 502 may be, for example, a server of a service provider, a device associated with a client (e.g., a client device), an on-chip system, and/or any other suitable computing device or computing system.

The example computing device 502 includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device implementation, implementation of functionality described herein may be distributed throughout the system 800. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   extracting feature maps from a hazy image of a scene, each of the feature maps conveying information about visual characteristics of the scene captured in the hazy image;
   computing portions of light that are not scattered by atmosphere and are captured from the scene to produce the hazy image, including using a trained model that derives the portions of light based on the visual characteristics conveyed by the feature maps;
   ascertaining, based on at least one of the feature maps, airlight of the hazy image that represents constant light of the scene; and
   generating a dehazed image from the hazy image using the computed portions of light and the calculated airlight.

2. A method as described in claim 1, further comprising:
   ascertaining airlight for each pixel of the dehazed image;
   smoothing the airlight ascertained for each of the pixels based on the hazy image; and
   adjusting the pixels of the dehazed image according to the smoothed airlight.

3. A method as described in claim 1, further comprising adjusting a brightness of the dehazed image to substantially match a brightness of the hazy image.

4. A method as described in claim 1, wherein the feature maps convey information about dark-channel of the hazy image, the dark-channel indicating which pixels in a region of the hazy image have a minimum intensity in at least one color channel.

5. A method as described in claim 4, wherein the feature maps that convey the information about the dark-channel are generated by extracting the dark-channel information at multiple different resolutions, and each of the feature maps conveying the information about the dark-channel at a respective resolution.

6. A method as described in claim 1, wherein the feature maps convey information about a maximum contrast between pixels in a region of the hazy image.

7. A method as described in claim 1, wherein the feature maps convey information about a hue disparity between pixels of the hazy image and pixels of a semi-inverse image obtained from the hazy image, the semi-inverse image obtained by replacing color channel values for each of the pixels in the hazy image on a per channel basis with a maximum of:
   an initial color channel value; or
   an inverse of the initial color channel value.

8. A method as described in claim 1, wherein the feature maps convey information about which pixel in a region of the hazy image has a maximum saturation in comparison to other pixels in the region.

9. A method as described in claim 1, wherein the airlight of the hazy image is calculated based on a feature map that conveys information about dark-channel of the hazy image.

10. A method as described in claim 9, wherein ascertaining the airlight of the hazy image includes:
    selecting pixels of the hazy image for which dark-channel values are larger than other pixels; and
    determining airlight for the pixel of the selected pixels that has a median dark-channel value.

11. A method as described in claim 1, further comprising:
    receiving an input via a user interface to dehaze the hazy image; and
    presenting the dehazed image via the user interface.

12. A method as described in claim 1, further comprising:
    presenting the dehazed image via a user interface configured as a view finder for a camera; and
    responsive to receiving a selection via the user interface to capture the scene, initiating generation of the dehazed image.

13. A method implemented by a computing device, the method comprising:
    obtaining input to dehaze an image of a scene; and
    generating a dehazed image of the scene, in part, by using a trained model to compute portions of light that are not scattered by atmosphere and are captured to produce the image and reflect an assessment of at least two of:
       dark-channel information extracted from the image at multiple different resolutions, the dark channel information that is extracted at each of the resolutions being suitable to generate a dark channel feature map that corresponds to the resolution;
       contrast information extracted from the image;
       hue-disparity information extracted from the image by determining a hue-disparity between pixels of the image and pixels of a semi-inverse of the image; or
       saturation information extracted from the image.

14. A method as described in claim 13, further comprising extracting the contrast information from the image at multiple different resolutions, the contrast information that is extracted at each of the resolutions being suitable to generate a contrast feature map that corresponds to the resolution.

15. A method as described in claim 13, further comprising:
    ascertaining airlight for each pixel of the dehazed image;
    smoothing the airlight ascertained for each of the pixels based on the image; and
    adjusting the pixels of the dehazed image according to the smoothed airlight.

16. A method as described in claim 13, further comprising adjusting a brightness of the dehazed image to substantially match a brightness of the image.

17. A method as described in claim 13, further comprising generating a hazy image of the scene by adding haze to the image, the haze being synthesized using the computed portions of light.

18. A system comprising:
    one or more processors; and
    a memory configured to store computer-readable instructions that are executable by the one or more processors to perform operations comprising:
       displaying a scene via a user interface; and
       responsive to receiving an input via the user interface to remove haze from the displayed scene:
          adjusting pixels of the displayed scene to remove the haze, the pixels being adjusted based on an assessment, performed using a trained model, of multiple different visual characteristics of the scene; and
          after the adjusting, applying a filter that modifies the adjusted pixels so that one or more visual characteristics of the adjusted pixels resemble the one or more visual characteristics of the pixels before the haze was removed.

19. A system as described in claim 18, wherein:
    the user interface comprises part of an editing application;
    the displayed scene is included as part of an image accessible to the image editing application; and
    the input to remove the haze from the displayed scene causes a dehazed image to be generated from the image.

20. A system as described in claim 18, wherein:
the user interface is configured as a view finder for a camera; and
the input received via the user interface causes the scene to be displayed in substantially real-time through the view finder with the haze removed.

\* \* \* \* \*